March 12, 1957    H. S. V. JÄRUND    2,784,540
APPARATUS FOR PRODUCING TETRAHEDRAL PACKAGES
Filed May 19, 1952    12 Sheets-Sheet 2

Inventor:
Harry Sigurd Valdemar Järund,
by Pierce, Scheffler & Parker,
Attorneys.

March 12, 1957 H. S. V. JÄRUND 2,784,540
APPARATUS FOR PRODUCING TETRAHEDRAL PACKAGES
Filed May 19, 1952 12 Sheets-Sheet 4

Inventor:
Harry Sigurd Valdemar Järund,
by Pierce, Scheffler & Parker,
Attorneys.

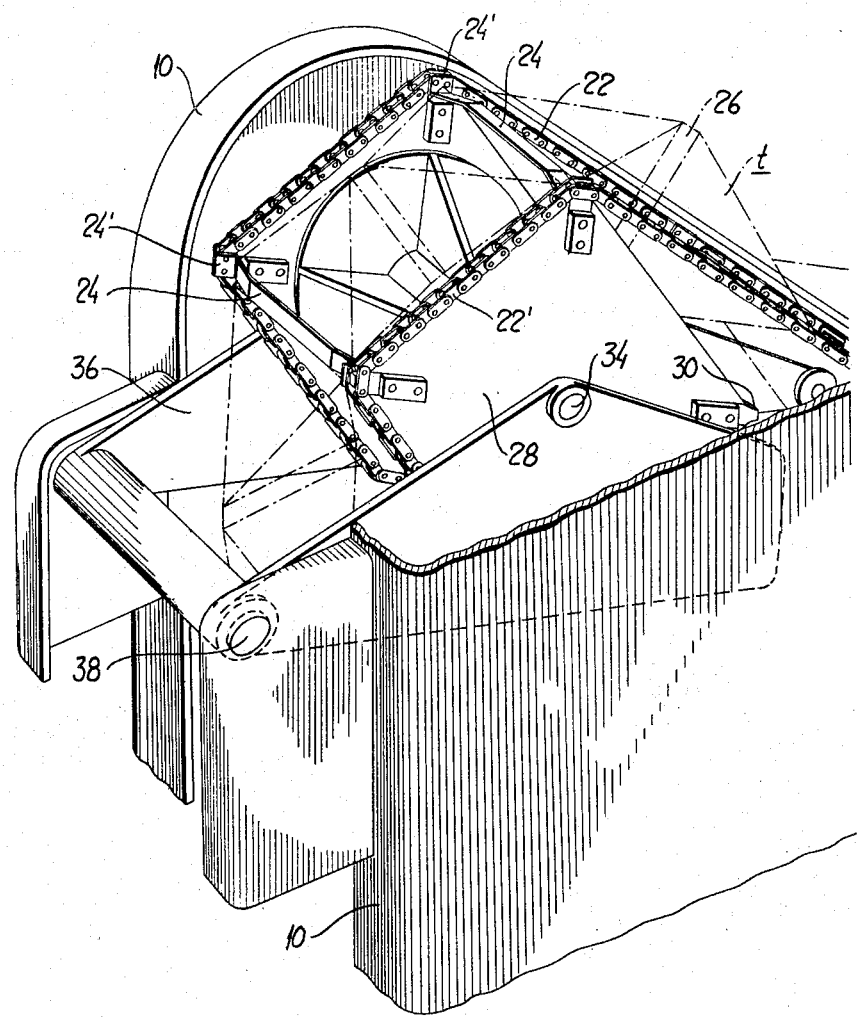

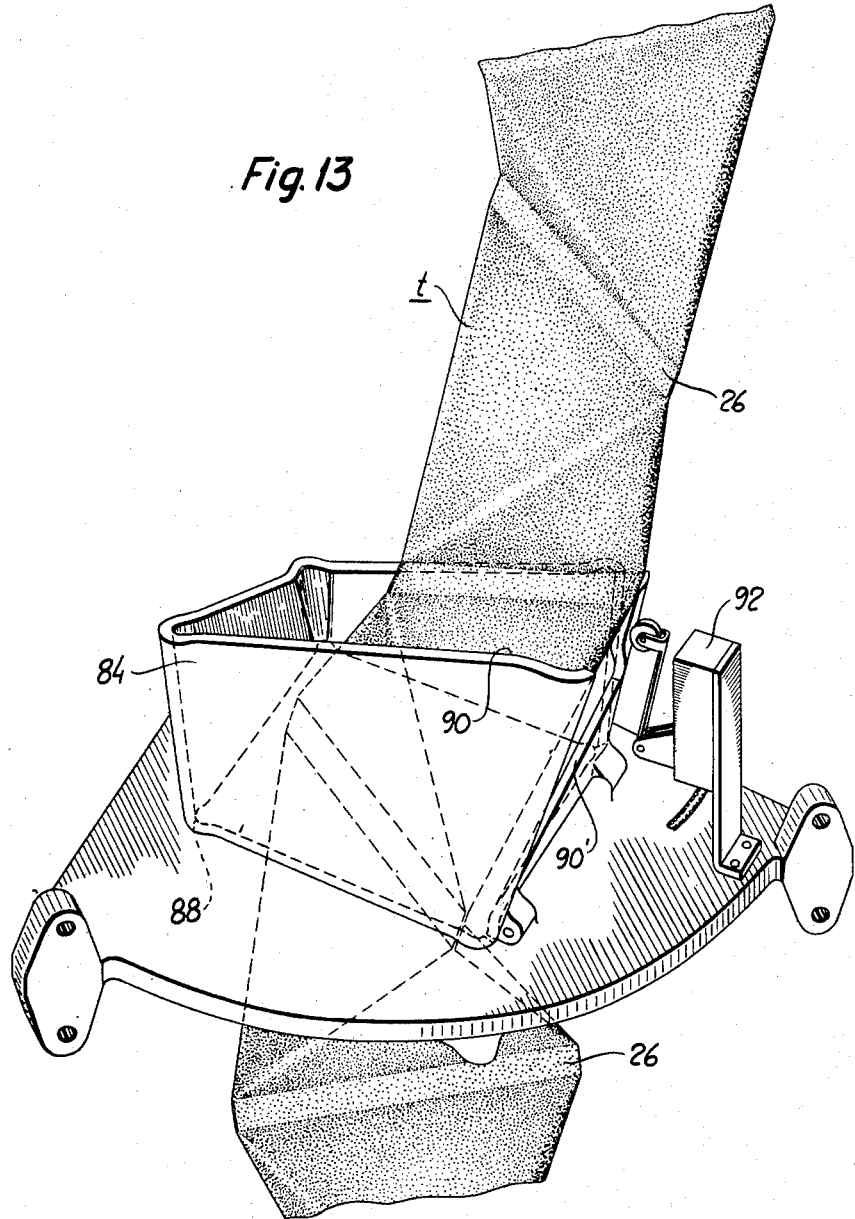

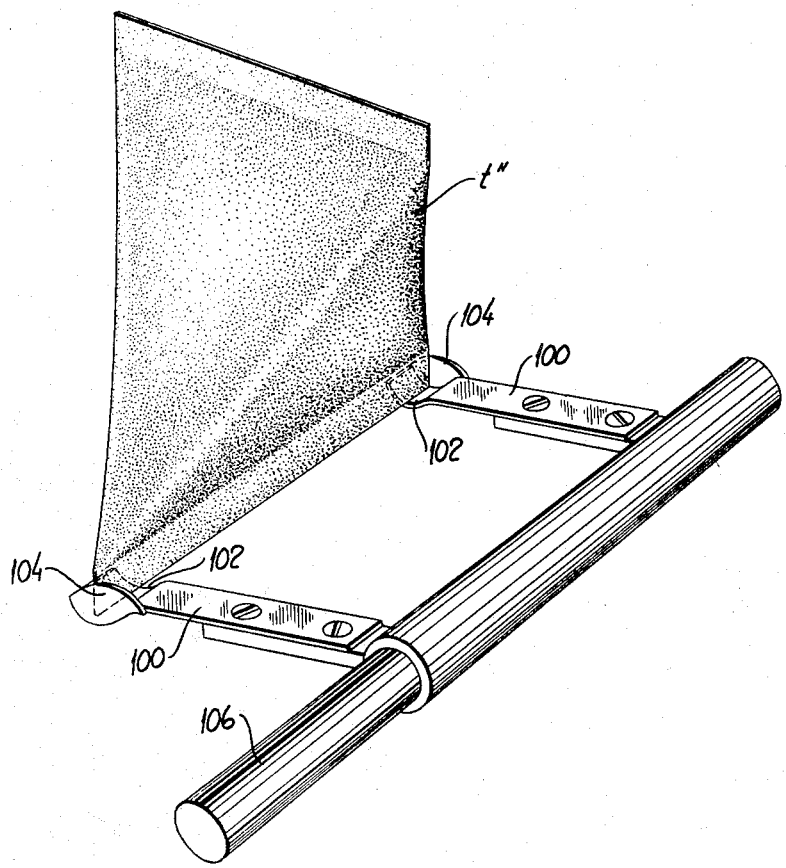

United States Patent Office 2,784,540
Patented Mar. 12, 1957

2,784,540

APPARATUS FOR PRODUCING TETRAHEDRAL PACKAGES

Harry Sigurd Valdemar Järund, Lund, Sweden, assignor, by mesne assignments, to Hermorion Ltd., Toronto, Ontario, Canada Application May 19, 1952, Serial No. 288,638

Claims priority, application Sweden May 21, 1951

14 Claims. (Cl. 53—180)

It previously has been proposed to produce and, if desired, simultaneously fill packages in the form of tetrahedrons by forming a web of suitably impregnated paper or similar sheet material into a tube or sleeve, introducing a fluent material into the tube, and whereupon this sleeve is alternately pressing and sealing the tube along lines in two directions perpendicular to each other and at equal distances from each other. By this method of procedure the tetrahedron shaped packages are obtained in the form of a coherent string similar to a string of pearls presenting pressed sealing joints alternately perpendicular to each other.

The present invention relates to an apparatus for forming and separating the individual tetrahedrons.

More specifically, the invention relates to an assembly of apparatus for forming a tube from a web of appropriate type, apparatus for pressing the tube to form an integral string of connected packages, apparatus for filling the individual packages, and apparatus for severing the package from the string; the severing apparatus being positioned laterally of the forming and filling apparatus to avoid difficulties and disadvantages incident to severing the packages simultaneously with their individual formation, and to reduce the overall height of the apparatus to substantially less than that required when the severing apparatus is located below the forming and filling apparatus.

One object of the invention is to provide apparatus operable to effect withdrawal of the formed tetrahedron string continuously from the tetrahedron shaping machine, and to effect the cutting-off of the individual tetrahedrons outside of the tetrahedron shaping machine during this continuous delivery.

Another object of the invention is to provide apparatus for effecting the cutting-off on two different levels in order that the cutting members may not obstruct each other, since they must operate in two directions perpendicular to each other, the apparatus including a conveyor for the tetrahedron string which is tiltable to compensate intermittently for the travel of the tetrahedron string in such manner that the joint to be severed is momentarily stationary during the severing operation.

A further object of the invention is to guide the free end of the tetrahedron string during the cutting-off operation so that the tetrahedrons are not damaged by the cutting members upon being advanced to cutting position, and further to receive the cut-off tetrahedrons on a suitable conveyor in order to transport them to a storing place or to a packing machine for packing the tetrahedrons in suitable containers.

For the purpose of attaining the above-mentioned objects and other advantages which will be obvious from the following description, the apparatus according to the invention as to its principal parts consists of the combination with the package forming and filling units of an endless conveyor mounted in a machine frame and provided with transverse stays which are arranged substantially horizontally and at such a mutual distance that the joint edges between the tetrahedrons extending in the same direction will rest against said stays and thus two tetrahedrons will be situated between each pair of adjacent stays. The conveyor at its delivery end is bent over a guide roller so shaped that the deflections will take place at the transverse stays. The said guide roller is so arranged as to collaborate with two severing means, one for each series of mutually perpendicular sealing joints between the tetrahedrons of the continuous string.

According to one embodiment of the inention, the severing means are stationary. In this case, the guide roller at the delivery end of the conveyor, the upper guide wheel, deflects the motion of the tetrahedron string into a vertical descending movement, whereby in the way of this string part there are provided guiding means for the tetrahedron string and cutting members disposed on different levels and operating in directions perpendicular to each other. The upper guide or pitch wheel can be raised and lowered, and its lifting and lowering movements are guided by means of a cam in such manner that during a cutting movement the guide roller is raised at such a velocity that the feeding speed of the tetrahedron string will be compensated thereby so that the joint to be cut through remains stationary in relation to the cutting members during the cutting work proper, while the feeding motion thereafter takes place at an increased speed, until the next joint to be cut through is situated exactly in line with its pair of knives. The actuation of the cutting members is controlled by other cams or eccentric wheels in such a timed relation to the lifting and lowering motion of the upper guide roller that the cutting motion takes place while the joint to be cut through is stationary.

Furthermore, for receiving the cut-off tetrahedrons there may be provided a conveyor, e. g. in the form of two, parallel, inverted cone belts the oblique surfaces of which face each other to form supporting surfaces for the tetrahedrons falling down from the cutting-off device. However, as the downturned edge of every second tetrahedron will be directed transversely to the direction of motion of the receiving conveyor, there is also provided a receiving and turning device by means of which those transverse tetrahedrons are turned one-half revolution so that all of the tetrahedrons will be brought into the same relative position on the cone belt conveyor. Also, the receiving and turning device is guided by means of a cam which is so timed, in relation to the cutting-off devices, that said receiving and turning device is brought into operation only for every other tetrahedron.

The invention will now be described in greater detail in the following and with reference to the accompanying drawings which by way of example, but not in a limiting sense, illustrate a suitable embodiment.

In the drawings:

Fig. 1 is a side elevation, partly in section, of a complete assembly according to this invention of a severing machine with a machine for forming a tube and for forming tetrahedrons from that tube in accordance with United States applications Serial Nos. 263,358 and 263,357 (now U. S. Patent No. 2,738,631), filed December 26, 1951, in the name of Harry S. V. Järund;

Fig. 6a is a sectional view of the tetrahedron-conveying means showing how individual tetrahedrons are supported thereon;

Fig. 9 being a view from above, and Figs. 10 and 11 being vertical sections showing the upper guide wheel with guiding means and the severing means respectively in said position;

Fig. 12 is a perspective view of the upper guide wheel;

Figure 1:
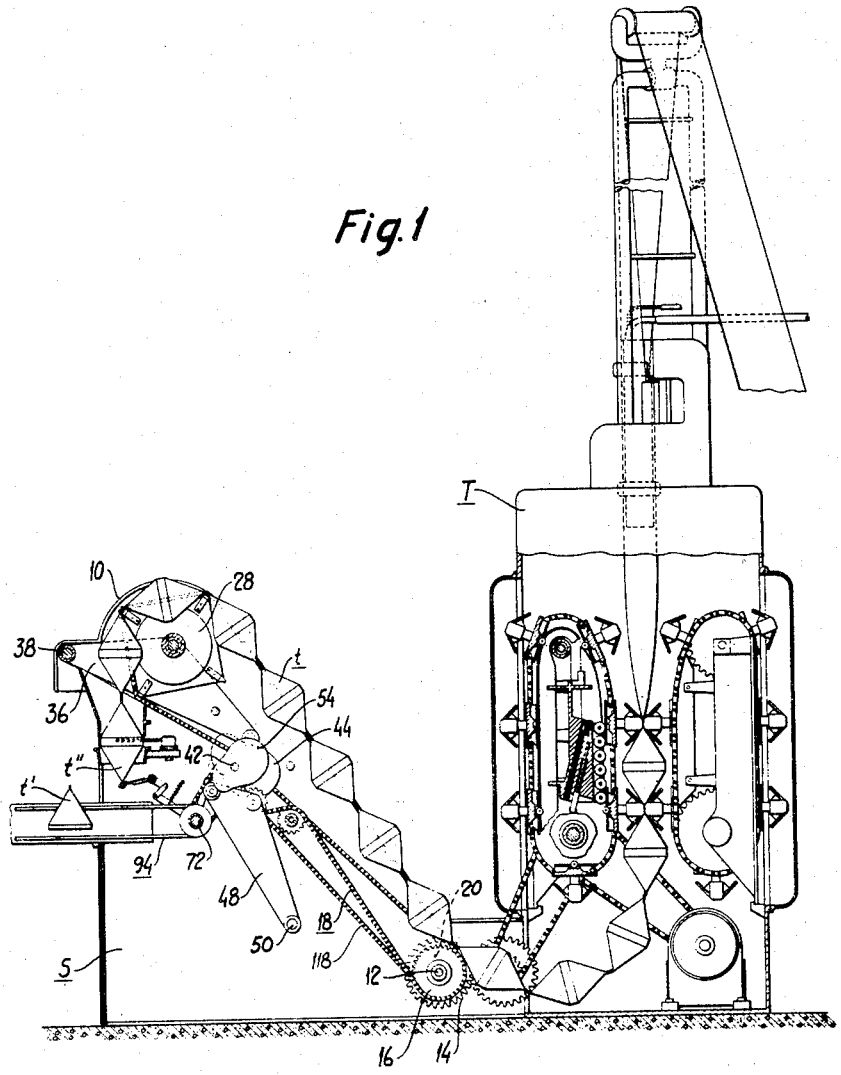
Figure 2:
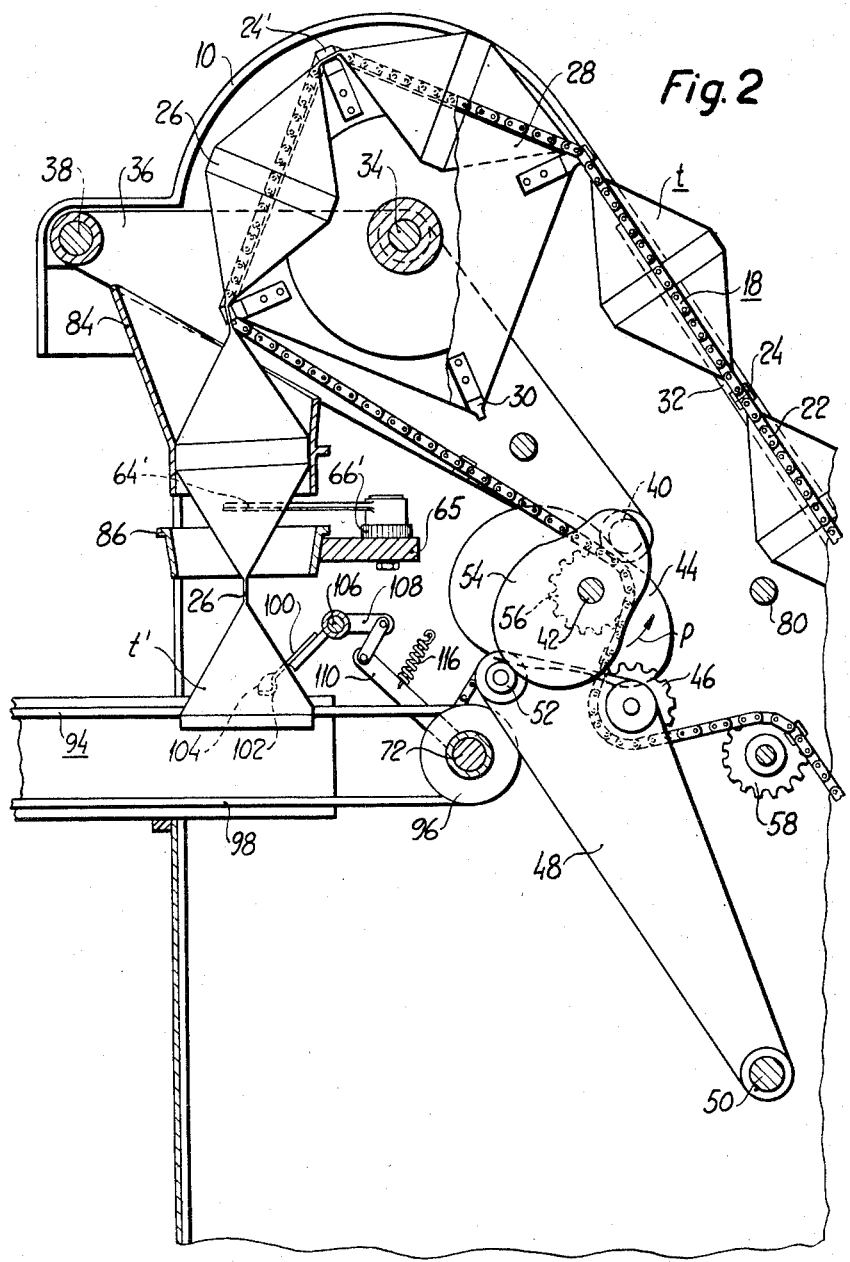
Fig. 2 is a section through the upper guide wheel and its operating means in that position where the lower severing means are ready to start cutting through a tetrahedron joint.

Fig. 13 is a perspective view illustrating the guiding means for the tetrahedron string above the upper severing means; and Fig. 14 is a perspective view of the device for receiving and turning the tetrahedrons being severed from the string by means of the upper severing means. In the drawing, T designates a machine for manufacturing and, if desired, simultaneously filling the tetrahedron shaped packages, as disclosed in United States applications Serial Nos. 263,357 (now U. S. Patent No. 2,738,631) and 263,358, filed December 26, 1951.

Connected to this tetrahedron shaping machine is a cutting-off machine S according to this invention so that both machines, as shown, preferably are driven from a common driving shaft in order to facilitate the synchronization of the movements of the two machines.

The cutting-off machine S constructed according to the invention comprises a machine frame 10 in which there is rigidly secured a lower shaft 12 carrying the driving wheels 14 of the cutting-off machine as well as a lower double guide roller and also driving wheels 16 for a chain conveyor 18 for transporting the tetrahedron string t coming from the tetrahedron machine T up to the cutting members proper. The driving wheel 14 and the double chain wheel 16 run freely on the shaft 12 and are preferably mounted on a common hub on which there also may be provided a chain wheel 20 for transmission of power to the cam or shaft of the machine. In the specific apparatus shown, the chain conveyor 18 is composed of double parallel chains 22 and 22' held together by means of transverse stays 24 (Fig. 3) disposed at a distance from each other equal to the total length of two tetrahedrons so that the tetrahedron string t may be placed on the conveyor in such a manner that every second transverse joint 26 between the tetrahedrons will rest against such a stay 24. As shown in the drawings of Fig. 12, these stays are, at their ends, formed with guide surfaces 24' adapted to guide the tetrahedron string t downwardly to the correct position on the conveyor 18.

However, the chain conveyor 18 passes over an upper double guide roller designed to form a pitch or skeleton wheel 28 provided with guide teeth 30 for the conveyor 18 which teeth are disposed at such pitch or spacing as to pick up, one after the other, the stays 24 holding together the chains 22, 22' and supporting the tetrahedron string t.

The ascending part of the chain is guided in a guide 32, while the descending part passes over a chain tightener for compensating the variations in the tension of the chain, as will be more closely described in the following.

The pitch or skeleton wheel 28 is mounted for free motion on a shaft 34 carried by a holder 36 which rocks about a shaft 38 in the machine frame 10 and carries, at its free end, a roller 40 cooperating with a cam 44 provided on an operating shaft 42 and so shaped that by the rolling of the roller 40 on the cam 44 the guide wheel 28 will be respectively raised and lowered at such a speed that, during raising, the tetrahedron string descending from the rotating guide wheel 28 will be stationary, while during the lowering motion it is advanced at a higher speed than the feeding velocity of the chain conveyor.

The raising and lowering of the upper guide wheel 28 as well as its discontinous shape brings about, alternately, stretchings and slackenings in the conveyor chains 22, 22'. In order to compensate this and thus to maintain a uniform tension in the conveyor chains, the return parts of these chains are permitted to pass over sprockets on a tensioning roller 46 mounted in a rocking lever 48 which is swingable about an axle 50 in the machine frame 10 and provided with a roller 52 cooperating with a cam 54 disposed on the same shaft 42 as is the cam 44. In order to reduce the requisite stroke for the movements of the rocking lever 48 there are provided, on either side of the tensioning roller 46, guide sprockets on rollers 56 and 58, respectively, rotatably mounted in the machine frame, of which one, 56, preferably is provided on the same shaft 42 as the cams 44 and 54.

During the period during which the tetrahedron string t leaving the upper guide wheel 28 is stationary relative to the machine frame, the cutting-off of the outermost tetrahedron from the tetrahedron string has to take place. Since the transverse joints 26 tying together the tetrahedrons extend alternately in directions perpendicular to each other, two sets of cutting members acting in different directions are required for these cutting operations, which members of course, if they do not travel with the string, must be disposed on different levels inter alia in order not to interfere with each other during the cutting operation. This involves in turn that the downwardly extending part of the tetrahedron string t must become stationary with the transverse joints to be cut through alternately on different levels. In order to render this possible, the cam 44, which guides the raising and lowering of the upper guide wheel 28, is formed with two top and two bottom positions, namely one top and one bottom position for each severing or cutting member.

Each cutting member consists of two cutting edges or knives 60 cooperating in the manner of a pair of scissors and fastened to particular holders 62, 64 and 62', 64', respectively, of which the holders 62, 64 appertain to the lower cutting member, while holders 62', 64' appertain to the upper one. Each of the different holders is swingable about a pin secured to a beam or plate 65 in the machine frame. The two cooperating knife holders in each pair are provided with toothed wheels 66 and 66', respectively, meshing with each other and mounted on the pins of the respective knife holder.

For mechanically guiding the cutting movements of the two pairs of knives there is provided a cam disc 68 preferably mounted on the same operating shaft 42 as the cams 44, 54 previously mentioned. Cooperating with the cam disc 68 is a roller 70 for the lower pair of knives and a roller 70' for the upper pair. The roller 70 is mounted in a lever 74 turnable about a fixed axle 72, to which lever is pivotally connected also a draw bar 76 adjustable with regard to its length, the other end of said bar 76 being articulated to a projection 78 on the lower knife holder 62.

The roller 70' is mounted in one end of a lever 74' turnable about a fixed axle 80, to the other end of which lever is pivotally secured a draw bar 76' adjustable as to its length, which is articulated to a toothed segment 82 meshing with toothed wheel 66' on the upper knife holder 62'.

Of course, the tetrahedron string should not be permitted to hang completely free during the severing work, as it may then easily oscillate so that, during the lowering motion of the vertically depending end of the tetrahedron string, the tetrahedrons may be damaged, e. g. by hitting against the edges 60. At the same time it is, of course, a desideratum that the cut-off tetrahedrons may be forwarded in a suitable orientation and order. For the purpose of complying with these desiderata, guiding means are disposed at the cutting points. A guiding means is provided immediately above each pair of knives, the upper guiding means being designated by 84 (Figs. 6 to 10) and the lower guiding means by 86 (Figs. 6 to 9). The upper guiding means is also shown in detail in Fig. 13.

Each guiding means 84 and 86, respectively, is formed with a passage of approximately square section (see Figs. 8 and 9) for the tetrahedron string, the square section substantially conforming with the contour of a projection in the plane of a tetrahedron standing on one sealing edge. For this purpose, the corners of the square passage are somewhat cut away, as shown at 88, in order to prevent the outer ends of a cut-off tetrahedron edge from hitting against the edges of the guiding means near the corners.

Figure 8:
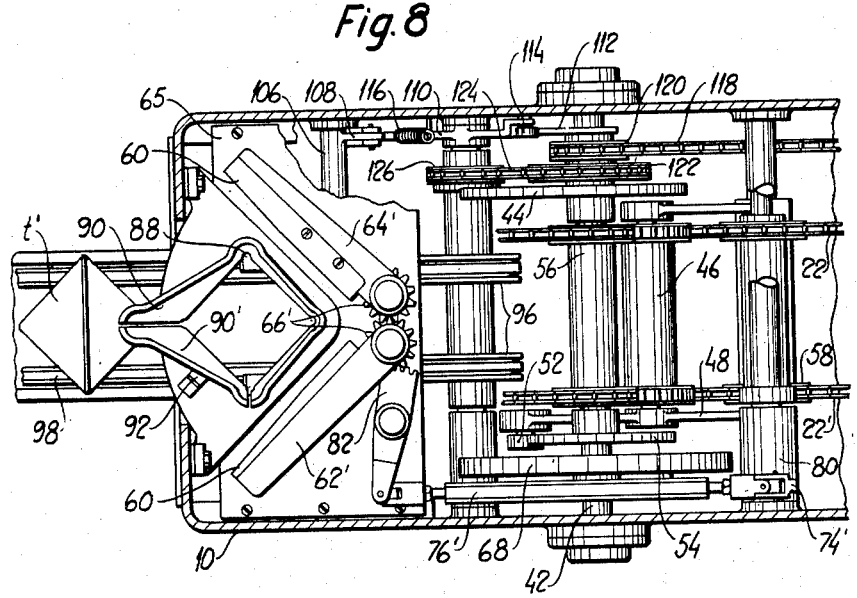
Figure 9:
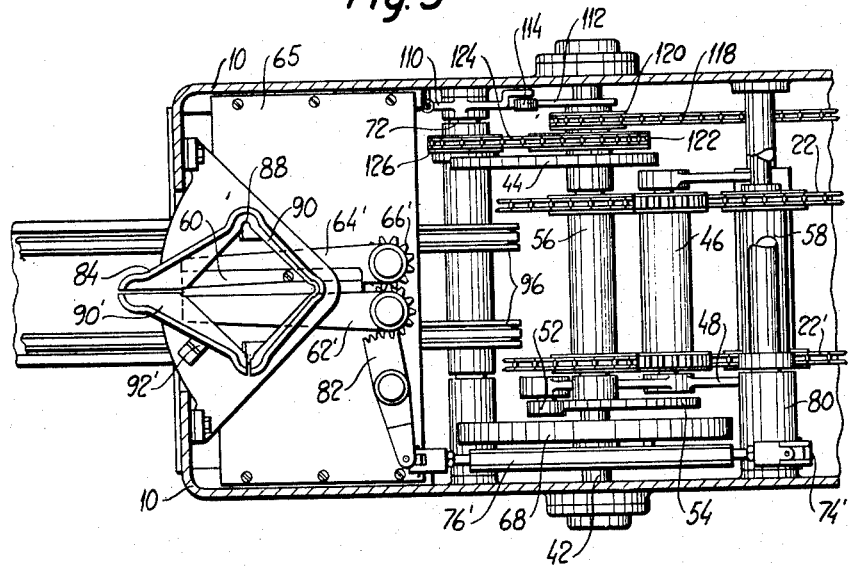
Figs. 9, 10 and 11 illustrate the positions of the upper guide wheel and the upper severing means with their operating means when the cutting through of a tetrahedron joint by the upper severing means is completed.

In order that, upon starting the machine, the tetrahedron string be correctly inserted in the upper guiding means 84, this latter is equipped with upwardly flared guide surfaces 90, 90', as shown in Figs. 8, 9 and 13. Preferably, one of these surfaces, as surface 90', is articulated about an edge or resilient so that, at a comparatively low load, it is bent or is hinged outwardly in a small degree and then actuates a switch 92 or the like which interrupts the current to the driving motor of the machine, e. g. at the increased load resulting from a stoppage of the tetrahedron string $t$ in the cutting devices or in the guiding means for these devices.

Disposed below the cutting devices is a conveyor 94, in the shown embodiment constructed as two parallel cone belts 98 turned upside down and passing over guide rollers 96. Two surfaces of the transported tetrahedrons, said surfaces extending from the same downturned edge, rest against the opposed oblique surfaces 130, 130, of the belts 98 (Fig. 6a).

As the joints (of the tetrahedron string) to be cut through extend alternately in directions perpendicular to each other, only every second tetrahedron $t'$, namely those cut off through a joint perpendicular to the direction of motion of the conveyor 94, may be permitted to fall directly down on the conveyor and, in this instance, are brought in the correct position, whereas the other tetrahedrons, $t''$, i. e. those cut off in a direction parallel to the direction of motion of the conveyor, have their depending edges disposed transversely to the direction of motion of the conveyor belts, and therefore must be turned in order to be brought in the correct position on the conveyor 94. Of course, this turning may be effected automatically when the downturned edge of every second tetrahedron hits against the two cone belts 98 and thus receives a motion impulse in the direction of motion of these belts, whereby the tetrahedrons are swung into the correct position. However, by this operation the distances between the tetrahedrons on the conveyor 94 will vary.

In order to bring about the requisite turning of every second tetrahedron so that all of the tetrahedrons will be located at the same distance from each other on the conveyor 94, and simultaneously to avoid impacts between the transverse tetrahedron edge and the conveyor 94, in the shown embodiment there is provided a special receiving and turning device (Figs. 7, 8, 10, 11, 14). This device consists of a receiver in the form of a forked rocking lever 100, the free ends of which are formed as hooks 102 possessing lateral guides 104 forming corners in which the downturned tetrahedron corners fit. The rocking lever 100 is swingable about a shaft 106 and is actuated through a link 108 and an angle lever 110, which is turnable about the shaft 72, from a cam 112 provided on the same shaft 42 as the cam disc 68 which regulates the cutting movements. At one end of the angle lever 110 is provided a roller 114 which is forcibly held against the cam 112 by means of a spring 116.

The shaft 42 carrying the different cams which control the raising and lowering of the upper guide wheel 28, the cutting movements for both pairs of knives, the regulation of the tension in the return part of the chain conveyor as well as the receiving and turning device for every second cut-off tetrahedron, is driven from the chain wheel 14 by means of a chain 118 passing over a chain wheel 120 on the shaft 42. From another chain wheel 122 on the same shaft extends a sprocket chain 124 to a chain wheel 126 on the shaft 72, whereby the conveyor 94 obtains its motion.

The apparatus according to the invention operates in the following manner:

The string or band of coherent tetrahedrons $t$ coming from the tetrahedron shaping machine T is placed on the conveyor 18 in such a manner that every second transverse joint between the tetrahedrons will rest against one of the transverse stays 24 so that thus two tetrahedrons hang freely between adjacent pairs of these stays, the connecting joint 26 being perpendicular to the plane of the conveyor 18. The tetrahedron band is fed by the conveyor 18 up to the guide wheel 28 and is bent by the same to downward motion, the bending of the band taking place along the joints resting against the transverse stays 24. The bent, depending part of the tetrahedron band is guided by the guide surfaces 90, 90' downwardly through the upper guiding means 84 and down into the lower guiding means 86.

Figure 3:
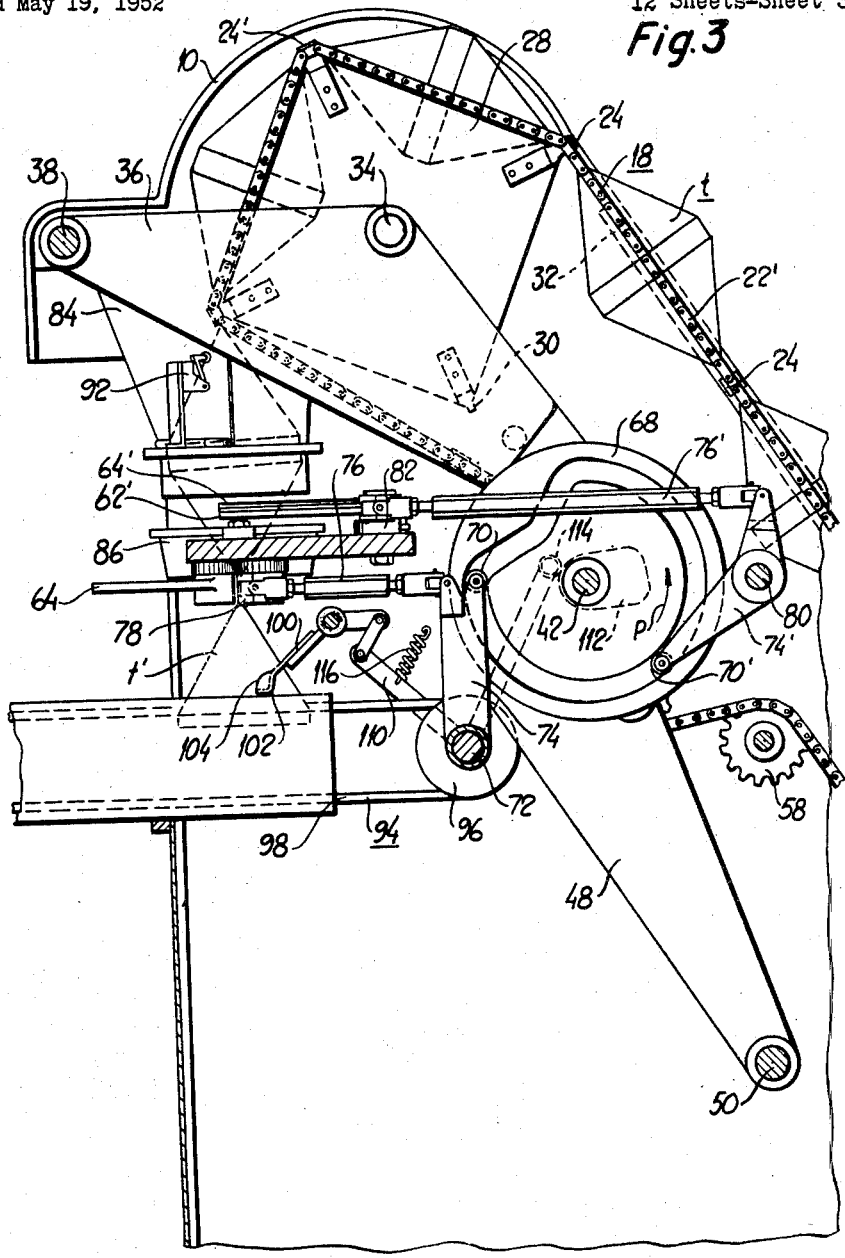
Figs. 3 and 4 show in section and in top plan, respectively, the lower severing means and its operating means in a position corresponding to that shown in Fig. 2.
Figure 4:
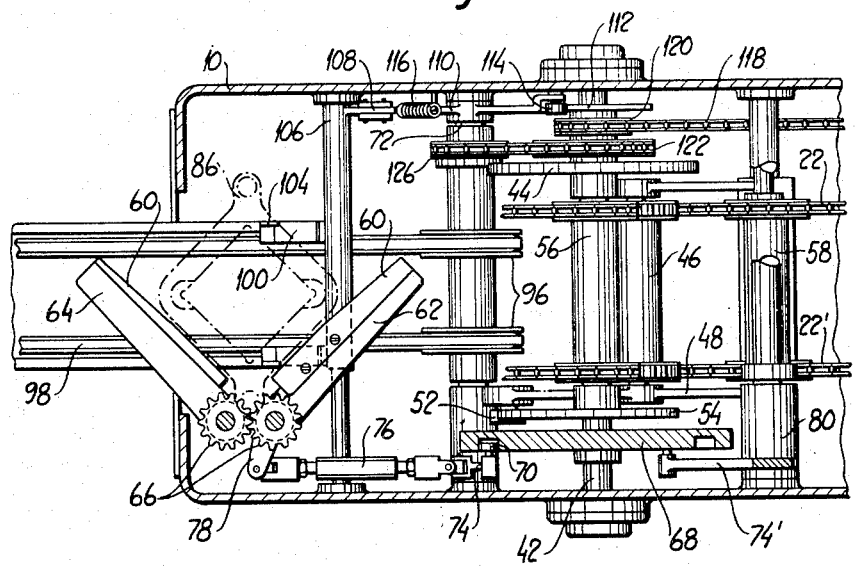
Figure 5:
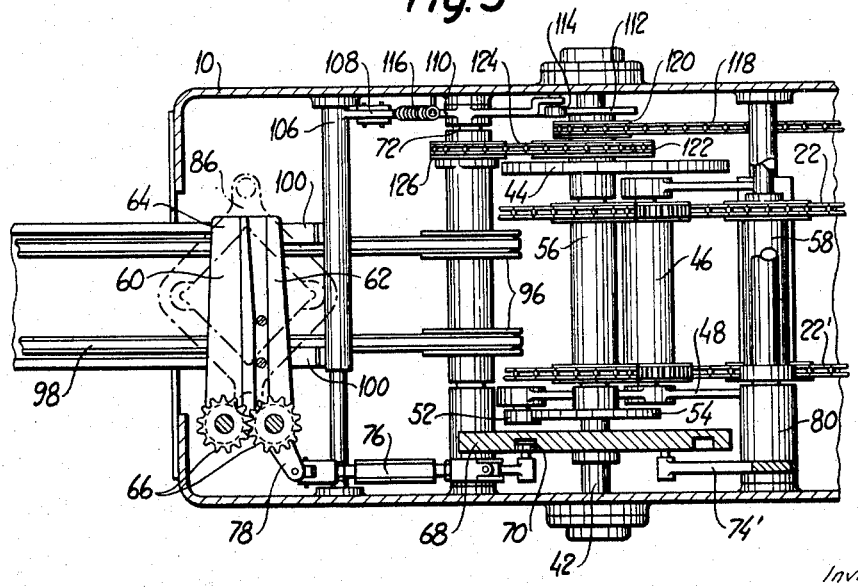
Fig. 5 is a view corresponding to that of Fig. 4 in the position when the lower severing means have completed a severing motion and are ready to open again.

For a more detailed description of the working process during the cutting operation, the position shown in Figs. 3 and 4 of the different cams on the operating shaft 42 is chosen as starting position. In this position, the guide wheel 28 is in its lowermost bottom position. The roller 40 is in the deepest valley of the cam 44, Fig. 6. At the same time, the roller 70 is located immediately before the entrance into the depressed groove portion of the cam disc 68. Upon rotation of the cam 44 and the cam disc 68 in the direction indicated by the arrow P, the roller 40 will roll on to a top of the cam 44, the holder 36 and thus the guide wheel 28 then being raised at a speed equal to the feeding speed of the tetrahedron band so that the part of the tetrahedron band $t$ depending from the pitch wheel 28 through the guiding means 84, 86 becomes stationary relative to the machine frame, while at the same time the roller 70 slides inwardly towards the center of the cam disc 68 and thus via the link mechanism 74, 76 impresses a pull on the projection 78 of the lower knife holder 62, whereby this latter is rotated and the rotary motion is transmitted by the toothed wheels 66 also to the other knife holder so that the edges 60 of the two knife holders thus perform a cutting operation through the stationary transverse joint located between two tetrahedrons which motion is completed in the position shown in Fig. 5.

The lowermost tetrahedron $t'$ cut off through the operation above described falls straight down, its downturned edge being located between the cone belts 98 of the conveyor 94 and being parallel to the oblique supporting surfaces 130, 130 of said belts.

In the continuation of the rotation in the direction of the arrow P, the roller 70 leaves anew the depressed portion of the cam disc, which movement is transformed, via the link mechanism 74, 76 into an opening movement of the knives. When the knives have been opened sufficiently, the roller 40 begins to slide down from the corresponding top position on the cam 44, whereby the holder 36 and thus the guiding wheel 28 will be lowered anew, in which event the feeding-down speed of the depending part of the tetrahedron band will be equal to the sum of the advancing speed of the conveyor 18 and the lowering speed of the guide wheel 28, whereby thus the continuous advancement of the conveyor 18 is, so to speak, transformed into an intermittent movement through the cutting device proper.

Figure 6:
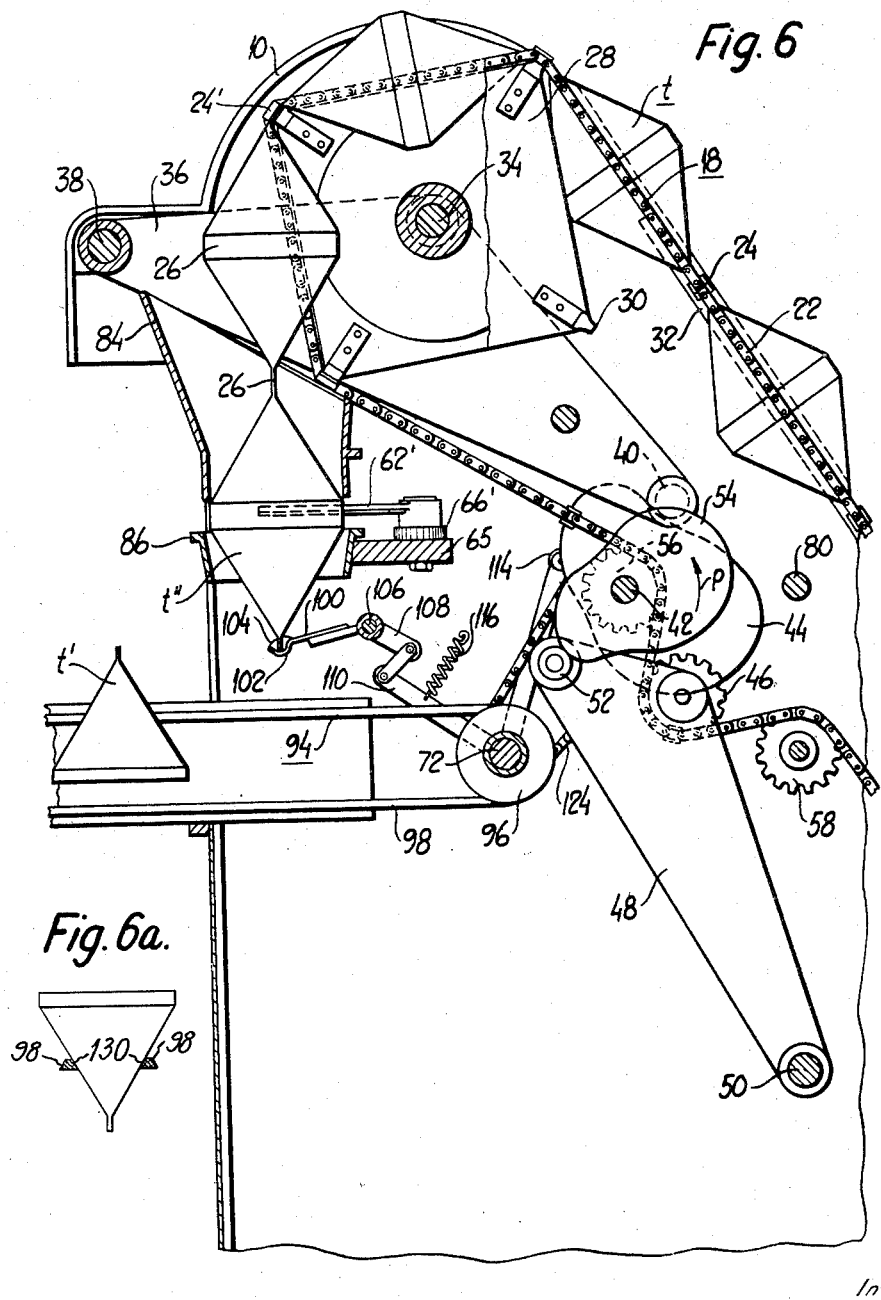
Figs. 6, 7 and 8 are views corresponding to Figs. 2, 3 and 4, respectively, illustrating the severing motions of the upper severing means.
Figure 7:
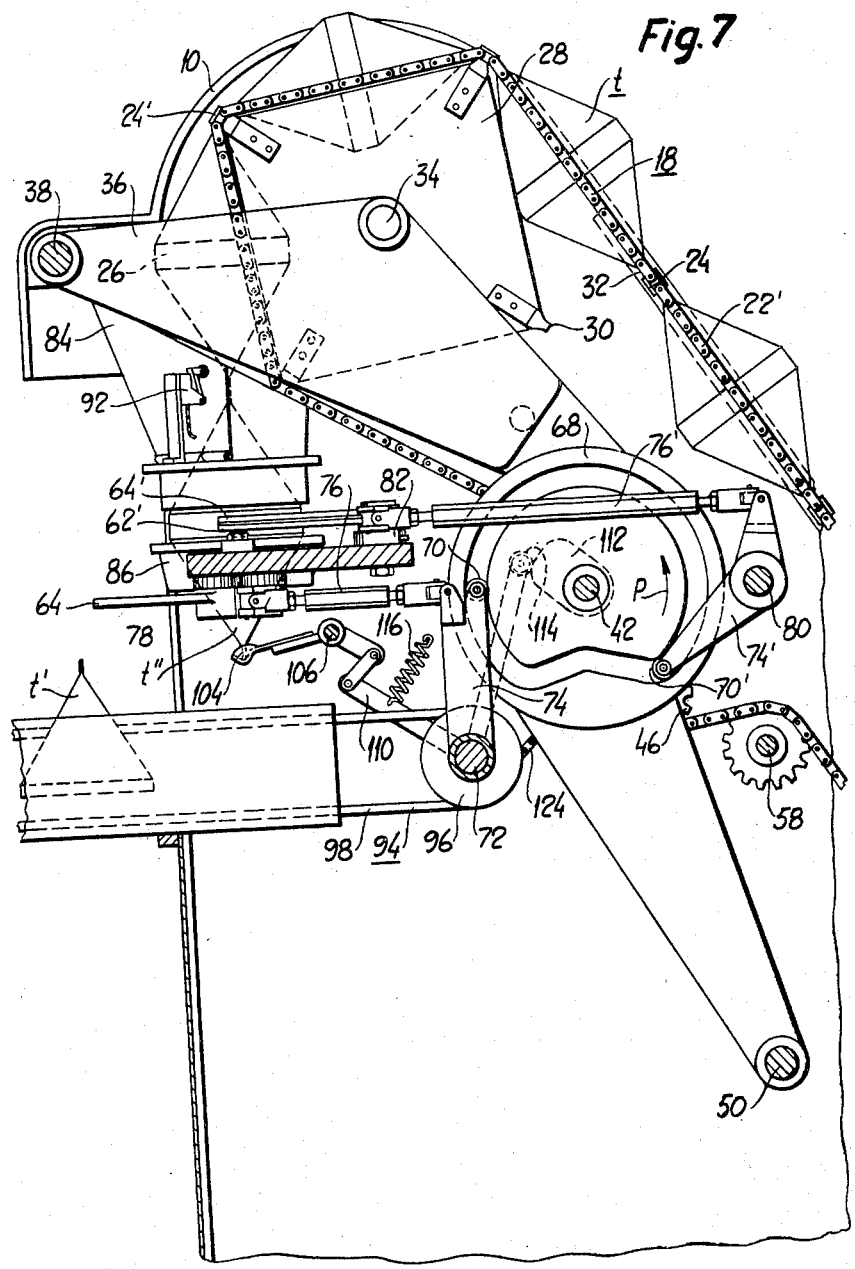

The feeding-down of the tetrahedron band thereafter continues until the different cams of the operating shaft 42 have been brought in the position (corresponding to the upper bottom position of the pitch wheel 28) shown in Figs. 6 and 7, at which the next joint between two tetrahedrons is situated just opposite the upper pair of knives 62', 64'. As the rotation in the direction of arrow P continues, the holder 38 is raised anew as the roller 40 rolls on to the other top of the cam 44, the raising then taking place in such a timed relation that the advancement of the tetrahedron band *t* is compensated and thus the joint now to be cut through becomes stationary right in front of the upper pair of knives until the roller 40 has reached the top point of the cam 44. During this period of standstill of the tetrahedron joint between the knives of the upper pair of knives, the roller 70' will slide into the depression of the groove in the cam disc 68 and thus, via the link system 74', 76' will cause a rotation of the toothed segment 82, which rotation is transformed, via the toothed wheels 66, into a cutting movement of the edges of the upper knife holders 62', 64' so that the tetrahedron joint is cut through.

Figure 10:
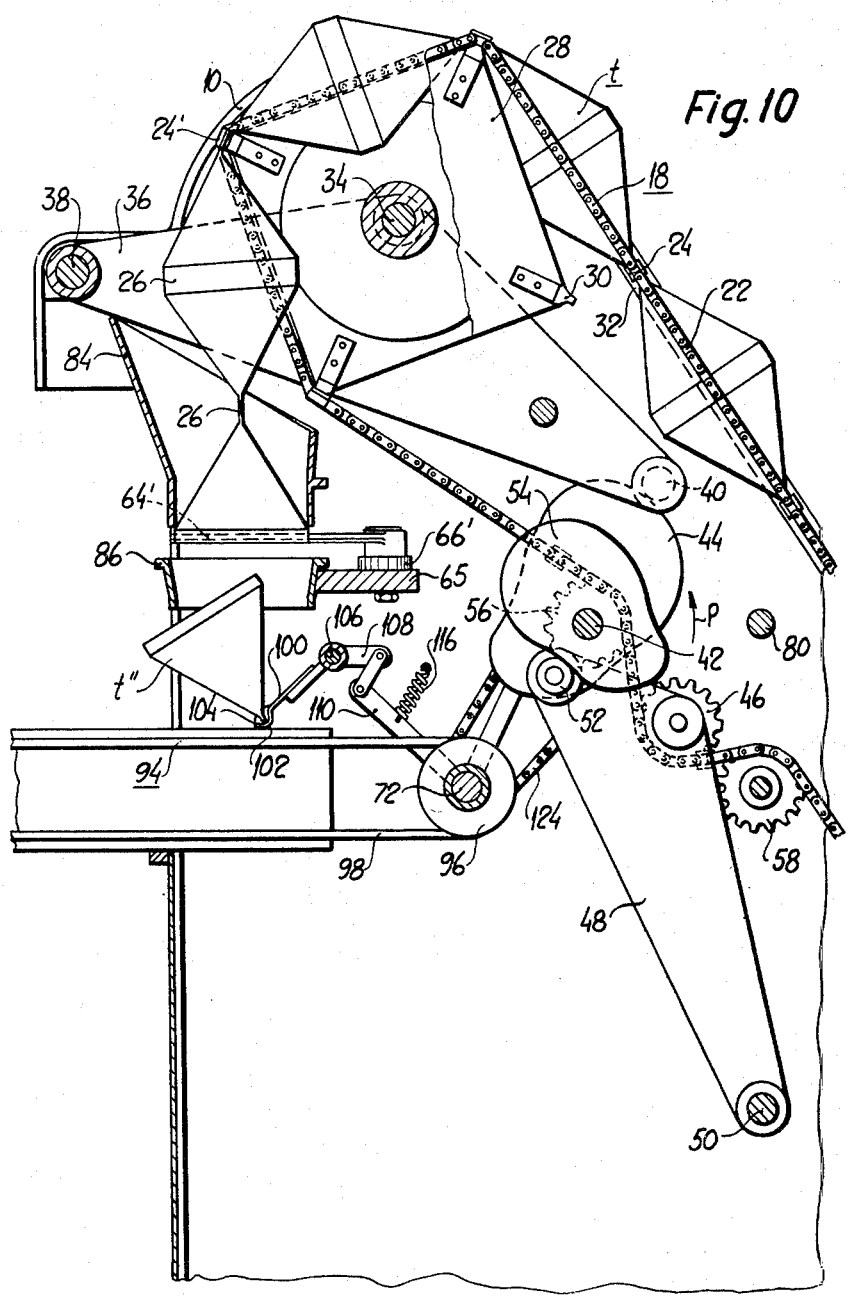
Figure 11:
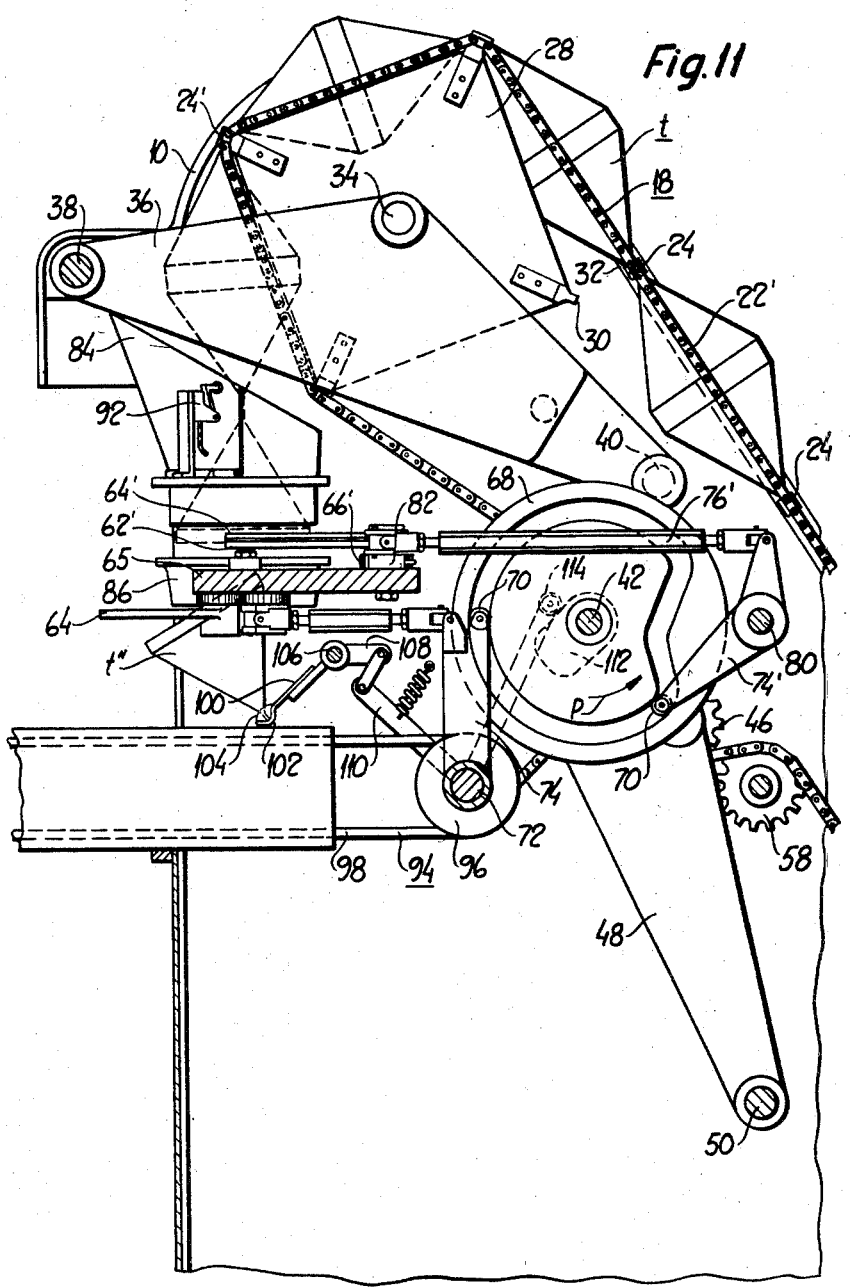

At the same time as the upper set of knives performs its cutting movement, the forked receiver 100 commences operation. When the operating members of the upper pair of knives have been brought in the position, shown in Fig. 7, i. e. when the knives are about to begin their cutting movement, the roller 114 has arrived onto the highest point of the cam 112, with the result that, through the intermedium of the angle lever 110 and the link 108, the receiver 100 has been rotated upwardly so that its hook-like ends 102 support the lower edge of the tetrahedron *t''* being cut off. The holder remains in this position until the upper knives have performed the cutting operation, which position is shown in Figs. 10 and 11. As the rotation of the shaft 42 from this position continues in the direction indicated by the arrow P, the roller 114 will anew roll off the top of cam 112, whereby the angle lever 110 is rotated in a clockwise direction from the position shown in Fig. 7, causing a rotation in the opposite direction of the forked receiver arm 100 into the position shown in Fig. 11. During this rotary motion, the lower edge of the now cut-off tetrahedron *t''* is carried downwardly to the right, as will be clear from a comparison between Figs. 7 and 11, so that the tetrahedron is tilted one-half revolution and lands on the conveyor 94, with that edge which was turned upwards during the cutting operation, now being directed downwardly and thus assuming the same position as the preceding tetrahedron *t'* which was cut off by the lower set of knives, whereupon the described course of events is repeated. By suitably dimensioning and adjustnig the receiving device, the cut-off tetrahedrons may be obtained always at the same distance from each other on the conveyor 94, by means of which they may be transported to a storing place or to a machine for packing them into suitable containers.

It is to be understood that the tubular element from which the string of tetrahedrons is formed may, if so desired, be formed of extrudable material, e. g. extrudable plastic material; also that to the tubular element—whether extruded or formed from a web—there may be applied a reinforcing strip or reinforcing sheath of suitable material.

I claim:

1. A device for severing into separate tetrahedrons a continuously advancing jointed string of tetrahedrons in which string adjacent joints are perpendicular to each other and the joints are at equal distances from each other, which comprises an endless conveyor provided with transverse stays disposed substantially horizontally and spaced at such a mutual distance that adjacent parallel joints of such string may rest against adjacent stays and thus a pair of tetrahedrons of such string may be supported between adjacent stays, said endless conveyor being inclined upwardly and including a skeleton wheel at the upper discharge end thereof having guide teeth spaced circumferentially to pick up in succession said transverse stays, driving means for said conveyor, means imparting cyclic lifting and lowering movements to said skeleton wheel to compensate for the conveyor feed during lifting movements whereby a descending part of said string of tetrahedrons after leaving said conveyor remains stationary during the lifting movements of said skeleton wheel, and mutually perpendicular severing means positioned at and operating in alternation to cut through the lowermost joint on the descending part of said tetrahedron string during each period of standstill for said descending part of said tetrahedron string.

2. A device according to claim 1 in which the said movement imparting means comprises a vertically tiltable rocking lever, means journalling said skeleton wheel on said rocking lever, and cam means driven by said drive means in synchronism with said conveyor for actuating said rocking lever.

3. A device according to claim 1, characterized in that each severing means includes a pair of knives cooperating as scissors, in that the two severing means are positioned at different levels opposite the descending part of such string, and in that both severing means are guided from a common cam the movement of which is synchronized with the movement of the cam controlling the lifting and descending movements of said skeleton wheel.

4. A device according to claim 3 characterized in that the two cams are journalled on the same shaft which is arranged to be driven at the same speed as the driving shaft for the tetrahedron conveyor.

5. A device according to claim 1 wherein the conveyor for such tetrahedron string comprises two spaced parallel link chains held together by said transverse stays.

6. A device according to claim 1 in combination with a tensioning roller for the tetrahedron conveyor, a rocking lever in which said roller is journalled, a cam actuating said rocking lever to compensate for stretchings and slackenings of the conveyor due to the lifting and descending movements of the skeleton wheel and due to the spacing of said guide teeth at the circumference of said skeleton wheel.

7. A device according to claim 1 in combination with guiding means provided immediately above each severing means, said guiding means providing substantially square shaped passages for the vertical part of such tetrahedron string the section area of said passages substantially conforming to the projection on a horizontal plane of a tetrahedron standing upright on a sealing edge, the corners of the square shaped passages further being provided with outwardly directed slots insuring free passage for the outermost corners of the downwardly directed sealing edge of the end tetrahedron in the descending part of each tetrahedron string.

8. A device according to claim 7 characterized in that the uppermost guiding means is provided with outwardly diverging guide vanes for guiding the vertical part of such tetrahedron string into the square shaped passage, at least one of said guide vanes being movable around its lower edge in combination with switch means responsive to movement of said movable guide vane for stopping the machine when the load produced on the said movable guide vane surpasses a determined value.

9. A severing device according to claim 1, in combination with a conveyor located below said severing means for receiving severed tetrahedrons, said receiving conveyor comprising two parallel running parts, the facing surfaces of which are inclined upwardly outwardly so as to form between them an angle substantially corresponding to the edge angle of a tetrahedron against which surfaces the severed tetrahedrons may rest on their surfaces extending from the down-turned edge which is parallel with the conveyor.

10. A severing device and receiving conveyor according to claim 9 wherein said mutually perpendicular severing means include a driving cam and follower means for operating said severing means in alternation, in combination with turning means for those tetrahedrons which during the severing operation have their downturned edge directed transversely to the direction of movement of the receiving conveyor, said turning means consisting of a fork shaped hook designed as a rocking lever cooperating with a cam and follower means synchronized with the guiding cam for the severing means in such a way that the forked hook supports the tetrahedron during the severing operation proper and then immediately is tilted downwardly while conveying the downturned edge of the tetrahedron in its swinging motion so that the tetrahedron is tilted half a revolution and thus lands on the receiving conveyor with its newly severed edge downturned.

11. A severing device and receiving conveyor according to claim 10 wherein said means imparting cyclic lifting and lowering movements to said skeleton wheel include a driving cam and a follower connected to said driving wheel and wherein all cams for controlling the lifting and lowering movements of the skeleton wheel, for controlling the operation of the severing means and for guiding the turning means are provided on a common shaft which is in direct driving connection with the driving shaft of the conveyor for the tetrahedron string as well as with the driving shaft of the receiving conveyor.

12. An apparatus assembly for providing a supply of tetrahedral packages filled with a liquid, which comprises apparatus for forming a continuous tube, apparatus for introducing liquid into the tube, apparatus for pressing the liquid-containing tube into an integral string of sealed tetrahedral packages filled with liquid, and apparatus for severing the string into individual packages, said severing apparatus including an endless conveyor for receiving said integral string of sealed tetrahedronal packages and transporting the same laterally of the forming, filling and pressing apparatus to discharge vertically downward by gravity, two sets of severing means in fixed positions adjacent the downwardly discharging string of tetrahedronal packages, said severing means cooperating with the respective series of mutually perpendicular joints between adjacent packages, means for cyclically lifting the discharge end of said conveyor to compensate the downward movement of said string of packages thereby effecting a dwell in the downward movement thereof, and means for actuating said severing means during said liftings of the discharge end of the conveyor.

13. An apparatus assembly for providing a supply of tetrahedral packages filled with a liquid, which comprises apparatus for forming a continuous tube from a web of appropriate type, apparatus for continuously introducing liquid into the tube, apparatus for periodically pressing the liquid-containing tube into an integral string of sealed tetrahedral packages filled with liquid, said packages being connected at common sealing joints, and apparatus for severing individual packages from said string at the common sealing joints, said severing apparatus including an endless conveyor for receiving said integral string of sealed tetrahedronal packages and transporting the same laterally of the forming, filling and pressing apparatus to discharge vertically downward from said conveyor at a uniform rate, two sets of severing means in fixed positions adjacent the downwardly discharging string of tetrahedronal packages, said severing means cooperating with the respective series of mutually perpendicular joints between adjacent packages, means for cyclically lifting the discharge end of said conveyor to compensate the downward movement of said string of packages thereby effecting a dwell in the downward movement thereof, and means for actuating said severing means during said liftings of the discharge end of the conveyor.

14. In a device for advancing a jointed string of tetrahedrons to be severed at the joints and in which string adjacent joints are perpendicular to each other and the joints are at equal distances from each other, an endless conveyor provided with transverse stays disposed substantially horizontally and spaced at such a mutual distance that adjacent parallel joints of such string may rest against adjacent stays and thus a pair of tetrahedrons of such string may be supported between adjacent stays, said endless conveyor being inclined upwardly and including a skeleton wheel at the upper discharge end thereof having guide teeth spaced circumferentially to pick up in succession said transverse stays, driving means for said conveyor, and means imparting cyclic lifting and lowering movements to said skeleton wheel to compensate for the conveyor feed during lifting movements whereby a descending part of said string of tetrahedrons after leaving said conveyor remains stationary for severing during the lifting movements of said skeleton wheel.

References Cited in the file of this patent

UNITED STATES PATENTS

| 438,529 | Cox | Oct. 14, 1890 |
| 552,947 | Williams | Jan. 14, 1896 |
| 919,363 | Lancey | Apr. 27, 1909 |
| 1,076,726 | Welch | Oct. 28, 1913 |
| 1,213,265 | Rowe | Jan. 23, 1917 |
| 1,630,345 | Lanza | May 31, 1927 |
| 1,907,742 | Coleman | May 9, 1933 |
| 1,908,855 | Makenny | May 16, 1933 |
| 2,113,658 | Lakso | Apr. 12, 1938 |
| 2,179,517 | Pelosi | Nov. 14, 1939 |
| 2,199,708 | Maxfield | May 7, 1940 |
| 2,258,347 | Biggert | Oct. 7, 1941 |
| 2,269,533 | Howard | Jan. 13, 1942 |
| 2,361,052 | Patterson | Oct. 24, 1944 |
| 2,499,564 | Binsack | Mar. 7, 1950 |
| 2,696,907 | Fisk | Dec. 14, 1954 |

FOREIGN PATENTS

| 390,427 | Germany | June 26, 1924 |
| 597,458 | Great Britain | Jan. 27, 1948 |